United States Patent
Vig et al.

(10) Patent No.: US 11,947,537 B1
(45) Date of Patent: Apr. 2, 2024

(54) AUTOMATIC INDEX MANAGEMENT FOR A NON-RELATIONAL DATABASE

(71) Applicant: Amazon Technologies, Inc., Seattle, WA (US)

(72) Inventors: Akshat Vig, Seattle, WA (US); Sharatkumar Nagesh Kuppahally, Issaquah, WA (US); Lewis Bruck, Bothell, WA (US); Somasundaram Perianayagam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 17/108,829

(22) Filed: Dec. 1, 2020

(51) Int. Cl.
*G06F 16/2453* (2019.01)
*G06F 9/54* (2006.01)
*G06F 16/22* (2019.01)

(52) U.S. Cl.
CPC .......... *G06F 16/24542* (2019.01); *G06F 9/54* (2013.01); *G06F 16/2282* (2019.01)

(58) Field of Classification Search
CPC .. G06F 16/24542; G06F 16/2282; G06F 9/54; G06F 16/22
See application file for complete search history.

(56) References Cited

U.S. PATENT DOCUMENTS

| | | | |
|---|---|---|---|
| 9,135,299 B2 | 9/2015 | Burger | |
| 9,298,761 B2 | 3/2016 | Graefe | |
| 10,135,703 B1* | 11/2018 | Gupta | G06F 11/3452 |
| 10,698,923 B2 | 12/2020 | Martin et al. | |
| 2011/0055201 A1* | 3/2011 | Burger | G06F 16/2453 |
| | | | 707/E17.057 |
| 2012/0215740 A1* | 8/2012 | Vaillant | G06F 16/273 |
| | | | 707/634 |
| 2014/0201192 A1* | 7/2014 | Hu | G06F 16/24553 |
| | | | 707/722 |
| 2014/0279855 A1* | 9/2014 | Tan | G06F 16/23 |
| | | | 707/609 |
| 2020/0226109 A1* | 7/2020 | Das | G06F 16/27 |

FOREIGN PATENT DOCUMENTS

WO    WO-2021073242 A1 *   4/2021   ......... G06F 16/2255

OTHER PUBLICATIONS

Google Patents English Language Translation of Yang (Year: 2021).*

* cited by examiner

*Primary Examiner* — Etienne P Leroux
*Assistant Examiner* — Farhad Agharahimi
(74) *Attorney, Agent, or Firm* — S. Scott Foster; Kowert, Hood, Munyon, Rankin & Goetzel, P.C.

(57) ABSTRACT

Index management for non-relational database systems may be automatically performed. Performance of queries to a non-relational database may be evaluated to determine whether to create or remove an additional index. An additional index may be automatically created to store a subset of data projected from the non-relational database to utilize when performing a query to the non-relational database instead of accessing data in the non-relational database.

20 Claims, 9 Drawing Sheets

US 11,947,537 B1

AUTOMATIC INDEX MANAGEMENT FOR A NON-RELATIONAL DATABASE

BACKGROUND

Non-relational databases offer flexible, high-performance storage solutions for data utilized by many different types of applications. Because data in non-relational databases can be stored without adhering to a pre-defined data schema, data can be easily maintained in a non-relational database for applications where the information collected for different objects is variable (e.g., a user record that has multiple profiles or a user record that has only one profile). However, access to data stored in non-relational database systems can be improved by relying upon additional indexes that store a projected subset of data from the non-relational database.

Figure 1:
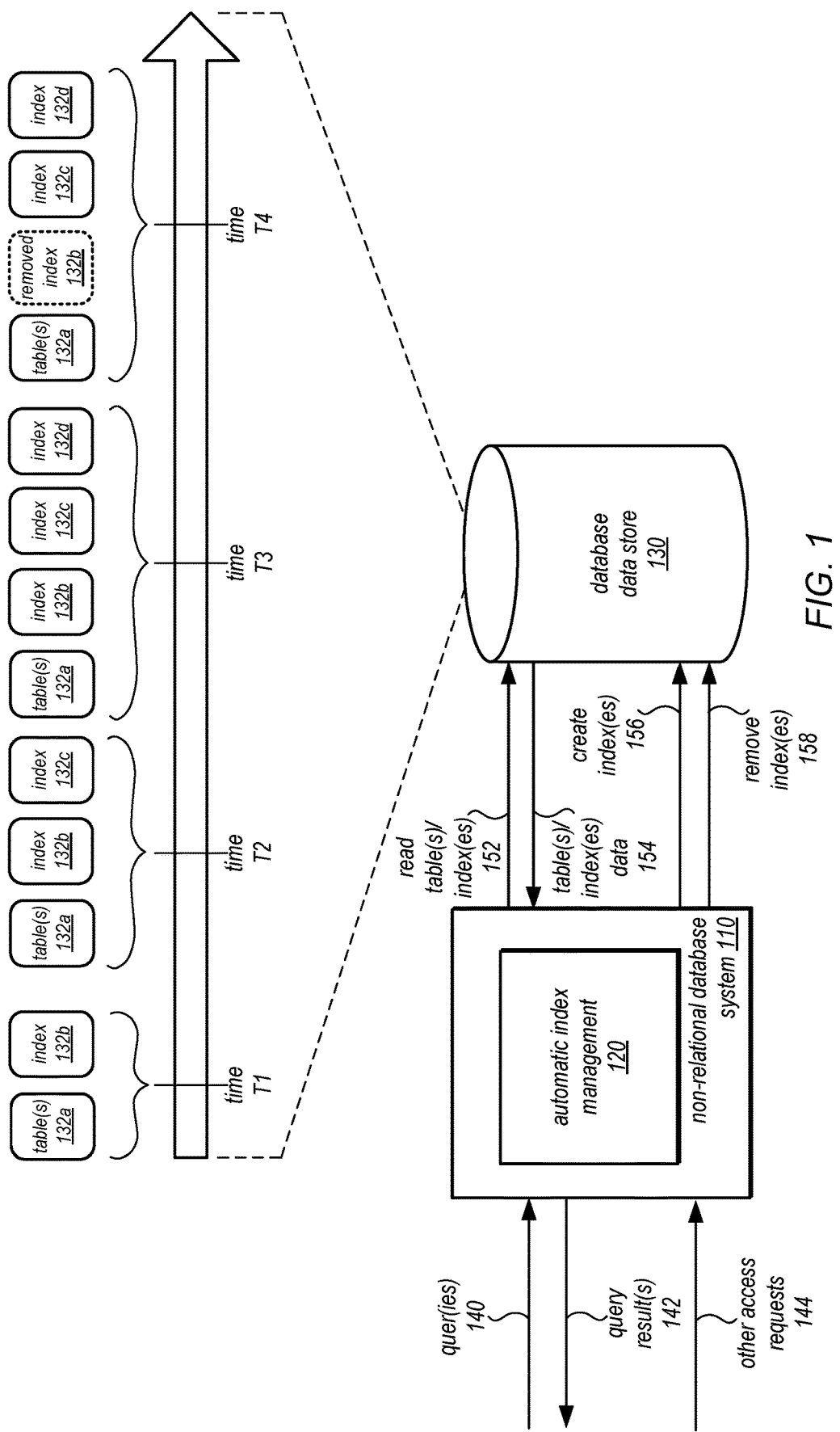
FIG. 1 is a logical block diagram illustrating automatic index management for a non-relational database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement automatic index management for a non-relational database, according to some embodiments. Non-relational database systems may, in various embodiments, provide a flexible system for storing data that provides quick and efficient access to the data without the non-relational database system imposing a schema on the data. Instead, client applications may implement a schema through the ways in which data stored is stored (e.g., by storing different items in tables, collections, or other database objects with attributes specified by a the client application—without the non-relational database system enforcing which attributes must be included in the items (although in some embodiments, a requirement to include a unique identifier for an item may be enforced in some embodiments without imposing other item requirements)). In this way, the complexity of operations to store and retrieve data (e.g., in response to various types of requests that query for data) at the non-relational database system can be minimized, resulting in good performance at the non-relational database system.

For example, tables of items (which may include one or more data values or attributes) may be stored, managed and accessed according to a key value pair which uniquely identifies an item in the table. Generally, this allows for fast throughput to update data in items or store new items. However, in some scenarios, locating items that have particular attributes may be resource intensive. For instance, identifying items with a particular attribute value that is within a range of values would likely instigate a scan of an entire table even though the range of may be only a small portion of possible values for the particular attribute or the particular attribute may not exist for some items in the table.

In some scenarios, additional indexes (sometimes referred to as a secondary index) may be created for a non-relational database. An additional index may store a subset of the data in a non-relational database projected from the data stored in the non-relational database (e.g., from a source table) in order to provide for more efficient performance in those situations where, like the example scan given above, accessing the data is less performant. For example, a secondary index created from a table in a non-relational data store may be created in order to provide an alternative way to access data projected from the table into the secondary index (e.g., copied to the secondary index and updated when the source table is updated) according to a schema for the secondary index (e.g., instead of relying upon a unique key value pair). For instance, a table that includes items for registered users may include a user identifier, which is unique and a primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above. Other attribute values may also be included in the secondary index, such as first and last name attribute values. In at least some embodiments, the key value pair that uniquely identifies the item may be included in the secondary index (e.g., the user identifier).

While secondary indexes provide further opportunities for improving the performance of accessing data in a non-relational database system, shifting the burden of schema implementation (e.g., for a user to identify item attributes in tables and/or secondary indexes) may result in some scenarios where unknown or changing workloads on data stored in a non-relational database system may become less optimal in terms of performance (e.g., slower query speeds and/or higher resource utilizations, such as storage waste when a secondary index is not frequently utilized by consumes large storage resources to maintain). Some opportunities for optimization (e.g., by creating new additional indexes to improve performance of frequent types of queries or by removing additional indexes to reduce waste) may therefore be missed or be hard to implement as such changes could result in costly client application modifications to utilize different tables and/or indexes). In various embodiments, automatic index management for a non-relational database may be implemented to recognize and optimize the performance of a non-relational database from client application workloads. In this way, a non-relational database system can automatically create and/or remove additional indexes without disrupting or causing changes to client applications to dynamically adapt to changes in workload, improving both the performance of the non-relational database system and the client applications that rely upon the non-relational database system.

Figure 2:
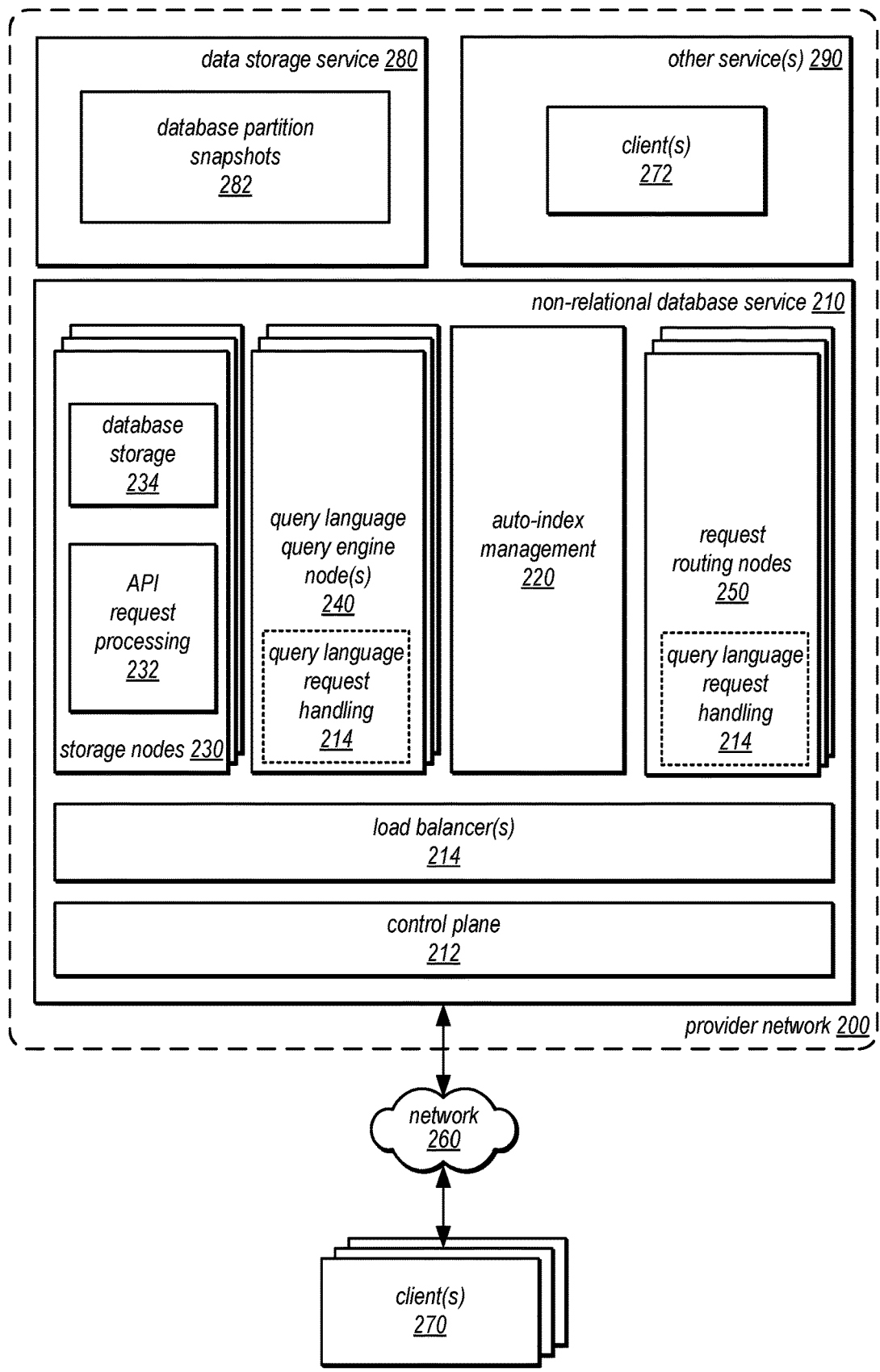
FIG. 2 is a logical block diagram illustrating a provider network that implements a non-relational database service that may implement automatic index management for a non-relational database, according to some embodiments.

FIG. 1 is a logical block diagram illustrating automatic index management for a non-relational database, according to some embodiments. Non-relational database system 110 may be implemented as a stand-alone, private database system, distributed database system, and/or publicly available, network-based service, like non-relational database service 210 offered by provider network 200 as discussed below with regard to FIG. 2. Non-relational database system 110 may store, access, read, write, update, or otherwise manage data stored in database data store 130 (e.g., one or more storage devices, such as hard disk storage devices). For example, as illustrated in FIG. 2, non-relational database system 110 may support handling various quer(ies) 140 for data and provide back respective query result(s) 142. Other access requests 144 (e.g., requests to insert, modify, delete, or otherwise write data, among other database requests) may also be supported by non-relational database system 110.

Data may be stored or organized in database data store 130 in various ways, for example, as one or more collections, one or more sets, one or more groups, or one or more tables, which may store respective data in items (e.g., as a collection of one or more item attributes as part of a single record or document that map fields or attribute names to values). As part of handling quer(ies) 140, non-relational database system 110 may read from various table(s) and/or index(es), as indicated at 152, in order to use returned data 154 to provide query result(s) 142. Although not illustrated, non-relational database system 110 may also perform operations to change or otherwise write to database data store for other access requests 144.

In various embodiments, non-relational database system 110 may implement automatic index management 120. Automatic index management 120 may automatically create and/or remove additional indexes for handling quer(ies) 140. For example, automated index management 120 may detect events or scenarios in which it may be optimal for query performance to create an additional index by evaluating the performance of quer(ies) 140, as indicated at 156, as well as other access requests 144. Automated index management 120 may identify what attribute values, fields, or other data to index based on performance of quer(ies) 120, such as by identifying various patterns, operations, or other information that is indicative of the schema to project the subset of data to include in the index. For example, automated index management 120 could evaluate a number of items read compared to the number of items returned in query result(s) to determine whether an index could reduce the number of items read relative to the number of items returned, in some embodiments. Various other evaluation and optimization techniques may be implemented as part of automatic index management 120, as discussed in detail below with regard to FIGS. 3 and 6, such as implementing various cost and retention scores to determine whether to create indexes. Similarly, in various embodiments, automatic index management 120 can determine from the performance of quer(ies) 140 to remove index(es), as indicated at 158, as well as other access requests (as discussed in detail below with regard to FIGS. 5 and 8).

Automatic index management for a non-relational database may allow for the number of created indexes to change over time. For example, as indicated in FIG. 1, at time T1, table(s) 132a and index 132b may be present in database data store 130, at time T2 an additional index, index 132c may have been created, which may provide for better performance of some queries by access the items stored in index 132c instead of those stored in the source table(s) 132a (or in addition to items stored in source table(s) 132a). Similarly, at time T3 another index, index 132d may have been created, which may provide further optimization for another query (or group of queries). As indicated at time T4, index 132b may have been removed. For instance, it may be that queries directed to items stored in removed index 132b may no longer be frequently performed, which may cause the storage waste of storing the subset of items from table(s) 132a also in index 132b to outweigh the performance benefit of retaining index 132b.

Non-relational database system 110 may utilize added indexes in order to increase performance of quer(ies) 140. For example, instead of accessing items stored in tables 132a, a query (or portion thereof) may be handled by reading and returning item data from an added index, like index 132c. In some embodiments, query handling may automatically resolve differences between versions of items stored in an index and a respective source table according to the read consistency to be applied to a query. For example, a strong consistency (e.g., read-after write, read-after-update, read-after delete, etc.) may be handled by joining, combining, replacing, and/or overwriting some item data read from an index with data read from a source table for that index (e.g., where one item that is returned from an index may be replaced with the version of that item from the source table because it has been updated prior to the receipt of the query but not yet updated in the index). For other types of consistency, such as eventual consistency, non-relational database system 110 may return the version of items in the index without checking for writes, updates, changes, deletions, and so on, for the item in the source table before returning a result.

Please note that previous descriptions of implementing automatic index management for a non-relational database are merely provided as logical examples. For example, various arrangements, architectures, or implementations of non-relational database system 110, database data store 130, automatic index management 120 and various database data, such as tables 132*a* and indexes 132*b*, 132*c*, and 132*d* may be implemented.

This specification begins with a general description of a provider network that may implement a non-relational database service that may implement automatic index management for a non-relational database. Then various examples of a non-relational database service are discussed, including different components/modules, or arrangements of components/module, that may be employed as part of implementing the database service, in one embodiment. A number of different methods and techniques to implement automatic index management for a non-relational database are then discussed, some of which are illustrated in accompanying flowcharts. Finally, a description of an example computing system upon which the various components, modules, systems, devices, and/or nodes may be implemented is provided. Various examples are provided throughout the specification.

FIG. 2 is a logical block diagram illustrating a provider network that implements a non-relational database service that may implement automatic index management for a non-relational database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In one embodiment, provider network 200 may implement various computing resources or services, such as non-relational database service(s) 210 (e.g., NoSQL databases, document databases, key-value stores, or other database services that do not require a pre-defined data model or structure (e.g. a relational structure) to be imposed upon data stored to perform queries or other access requests to the data), and other 290, such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of non-relational database service 210) may be implemented by a particular node or may be distributed across several nodes. In some embodiments, a given node may implement the functionality of more than one service system component (e.g., more than one data store component).

Non-relational database service 210 may include various types of non-relational database services, in one embodiment, for storing, querying, and updating data. Such services may be enterprise-class database systems that are highly scalable and extensible. In one embodiment, queries may be directed to a database in non-relational database service 210 that is distributed across multiple physical resources, and the database system may be scaled up or down on an as needed basis. The database system may work effectively with database schemas of various types and/or organizations, in different embodiments. In one embodiment, non-relational database service 210 may provide a RESTful programmatic interface in order to submit access requests (e.g., to get, insert, delete, or query data).

In one embodiment, clients 270 may encompass any type of client configurable to submit network-based requests to provider network 200 via network 260, including requests for non-relational database service 210 (e.g., to query a database hosted in non-relational database service 210). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in non-relational database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 270 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service), such as client(s) 272.

In one embodiment, a client 270 may provide access to provider network 200 to other applications in a manner that is transparent to those applications. For example, client 270 may integrate with a database on non-relational database service 210. In such an embodiment, applications may not need to be modified to make use of the storage system service model. Instead, the details of interfacing to the non-relational database service 210 may be coordinated by client 270.

Client(s) 270 may convey network-based services requests to and receive responses from provider network 200 via network 260, in one embodiment. In one embodiment, network 260 may encompass any suitable combination of networking hardware and protocols necessary to establish network-based-based communications between clients 270 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 270 may communicate with provider network 200 using a private network rather than the public Internet.

Non-relational database service 210 may implement request routing nodes 250, in one embodiment. Request routing nodes 250 may receive, authenticate, parse, throttle and/or dispatch service or other access requests, among other things, in one embodiment. In one embodiment, request routing nodes 250 may support handling requests formatted according to an interface to support different types of web services requests. For example, in one embodiments, non-relational database service 210 may implement a particular web services application programming interface (API) that supports a variety of operations on tables (or other collections of data objects) that are maintained and managed on behalf of clients/users by the non-relational database service (and/or data stored in those tables/collections). In one embodiment, non-relational database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in non-relational database service(s) 210.

In one embodiment, non-relational database service 210 may implement control plane 212 to implement one or more administrative components, such as automated admin instances which may provide a variety of visibility and/or control functions). Control plane 212 may provide visibility and control to system administrators, detect split events for partitions of tables at storage nodes, and/or anomaly control, resource allocation, in one embodiment. In one embodiment, control plane 212 may also include an admin console, through which system administrators may interact with database service 210 (and/or the underlying system). In one embodiment, the admin console may be the primary point of visibility and control for non-relational database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 212 may provide an interface or access to information stored about one or more detected control plane events, such as split requests to be processed, at non-relational database service 210, in one embodiment.

Control plane 212 may direct the performance of different types of control plane operations among the nodes, systems, or devices implementing database service 210, in one embodiment. For instance, control plane 212 may communicate with storage nodes to initiate the performance of various control plane operations, such as moves, splits, update tables, delete tables, create indexes, etc. . . . In one embodiment, control plane 212 may include a node recovery feature or component that handles failure events for storage nodes 230, query language query engine nodes 240, and request routing nodes 250 (e.g., adding new nodes, removing failing or underperforming nodes, deactivating or decommissioning underutilized nodes, etc).

In various embodiments, non-relational database service 210 may implement one or more load balancers 220 to direct requests to the appropriate components and distribute load. For example, load balancers may balance requests among request routing nodes (and/or query language query engine node(s) 240).

In one embodiment, non-relational database service 210 may also implement a plurality of storage nodes 230, each of which may manage one or more partitions of a database table (or other collection of data items) and/or indexes projected from database tables on behalf of clients/users or on behalf of non-relational database service 210 which may be stored in database storage 234 (on storage devices attached to storage nodes 230 or in network storage accessible to storage nodes 230).

In one embodiment, non-relational database service 210 may implement a separate fleet or service of query language query engine nodes, which may implement query language request handling 214, as discussed in detail below with regard to FIG. 4.

Storage nodes 230 may implement API request processing 232, in one embodiment. API request processing 232 may create, update, define, query, and/or otherwise administer databases, in one embodiment. In one embodiment, API request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, API request processing 232 may also perform other management functions, such as enforcing access controls or permissions, concurrency control, or recovery operations.

In one embodiment, non-relational database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the non-relational database service 210. Moreover, different replica groups may utilize overlapping nodes, where a storage node 230 may be a member of multiple replica groups, maintaining replicas for each of those groups whose other storage node 230 members differ from the other replica groups.

In some embodiments, non-relational database service 210 may implement a non-relational data model may include tables (or alternatively collections) containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no predefined schema other than their reliance on the primary key, in some embodiments. Data in items may be nested, in some embodiments, such that an attribute that has a sub attribute which has a sub-sub attribute, etc.

Non-relational database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by non-relational database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by non-relational database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation (JSON) or ION), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Non-relational database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, non-relational database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
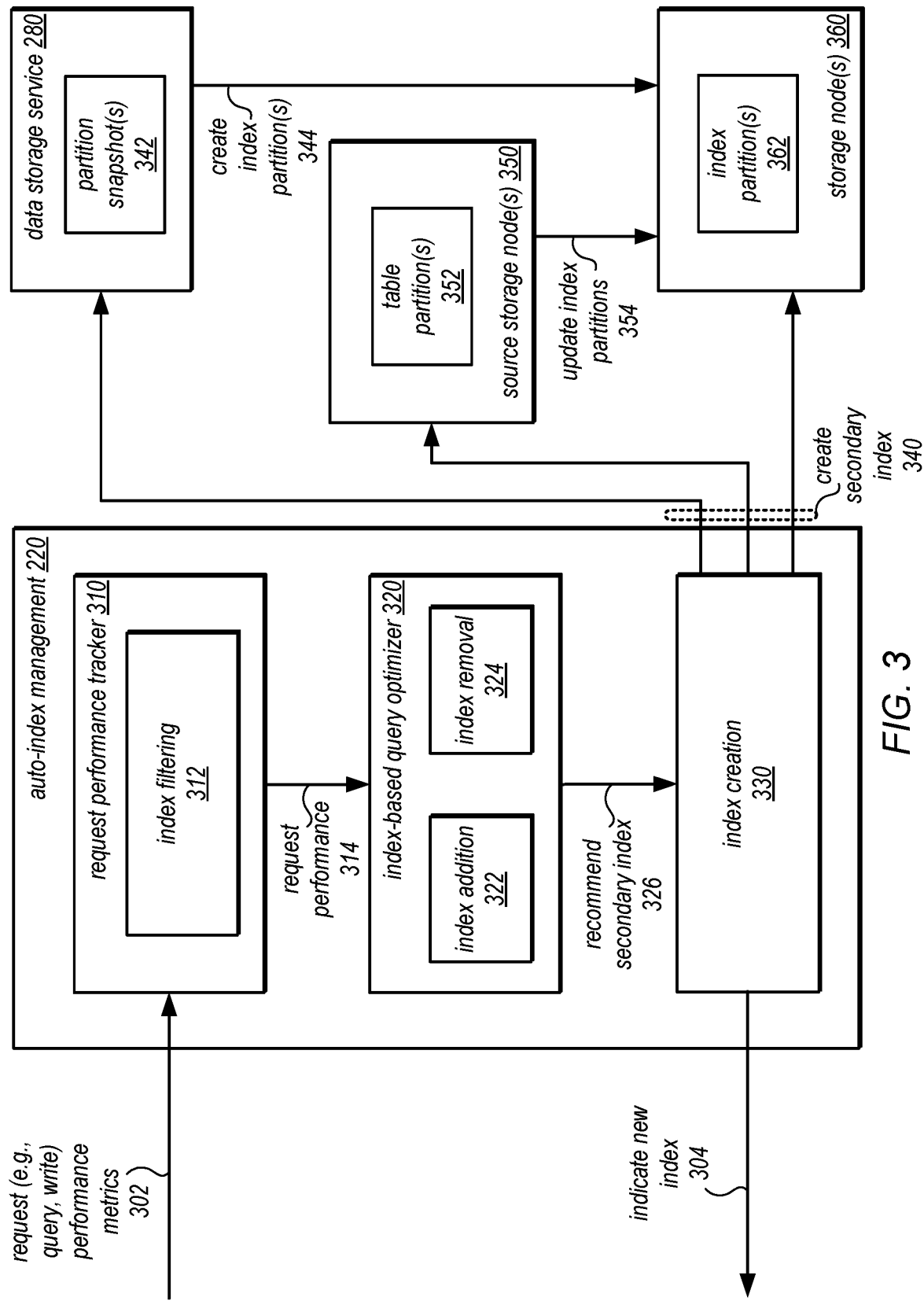
FIG. 3 is a logical block diagram illustrating auto-index management for evaluating query performance to automatically create a secondary index, according to some embodiments.

Non-relational database service 210 may implement auto-index management 220. Auto-index management 220 may create and remove additional indexes in order to optimize query processing, in various embodiments. FIG. 3 is a logical block diagram illustrating auto-index management for evaluating query performance to automatically create a secondary index, according to some embodiments.

Auto-index management 220 may implement request performance tracker 310, in some embodiments. Request performance tracker 310 may collect or obtain request performance metrics 302 (e.g., performance metrics related to queries and other access requests, like requests that cause writes). Request performance metrics 302 may be provided by query language engine node(s) 240, request routing nodes 250 and/or storage nodes 230, in some embodiments. Request performance metrics 302 may include various features of query performance, such as resource utilization (e.g., for memory, storage, network, processor, etc.), performance time, number and/or type of operations for queries (e.g., scans, lookups, etc.), and/or any other information descriptive of the performance of queries at non-relational database service 210. Request performance tracker 310 may generate or create derived metrics or other performance measures from obtained request performance metrics 302. For example, request performance tracker may implement different measurement time periods (e.g., 5 seconds, 1 minute, etc.) in which a metric (e.g., memory utilization) may be collected and/or averaged. In some embodiments, multiple measurement time periods of different lengths, which may overlap, may be considered. Further performance measurements may be calculated, such as the rate of change within or between measurement time periods (e.g., to distinguish between short term performance bursts and long-term workload changes). Request performance tracker 310 may determine performance that describes operations with respect to stored items, such as the number of items returned as a percentage of the total number of items read (e.g., which may be indicative of efficiency of a table or index to quickly provide results for a query) or written (e.g., which may be indicative of the workload, and therefore cost, to maintain a secondary index if created from a source table). Request performance tracker 310 may also determine measurements such as query frequency, write frequency, or other statistical measurements of requests.

In some embodiments, request performance tracker 310 may record, store, provide or publish query and/or other request performance, as indicated at 314. Query performance may be organized in various ways. For instance, query performance may have individual queries (which may be described or provided as part of request performance metrics 302), categorizations of queries or other structures that indicate one (or multiple) performance measurements for the query (or query category/classification). For example, a received query may have signature, mapping, or other information that is used to access the query performance for that query to perform an update (e.g., to update query frequency information for a same query performed multiple times). In some embodiments, a query may be categorized (or classified) in order to group performance measurements common to that query category/classification so that indexing decisions (to create or remove) common to that category In some embodiments, request performance tracker 310 may implement index filtering 312. Index filtering 312 may prune, halt, or otherwise remove tracking for some queries or indexes according to their respective size and/or frequency of access. For example, index filtering 312 may stop tracking (or not begin tracking) query performance for a query with a frequency that is below a frequency threshold (e.g., once per minute). Similarly, size of an index that was automatically created may indicate that maintaining the index does not significantly impact non-relational database system performance (e.g., the size of the index is so small that the storage utilization costs for retaining the index are not likely to be outweighed by the performance benefit the index provides).

Auto-index management 220 may implement index-based query optimizer 320, in various embodiments. Index-based query optimizer 320 may implement various techniques to create additional indexes, as indicated at 322 and as discussed with regard to FIG. 3, and to remove indexes, as indicated at 324 and discussed with regard to FIG. 5. Index addition 322 may make decisions to create additional indexes by evaluating query and/or other request performance 314 in various ways. For example, index addition 322 may perform a cost-benefit analysis on index creation, comparing benefit(s), such as the frequency at which a possible index would be accessed along with the performance improvement that the possible index would provide for query performance (e.g., how much faster the query would perform) against storage costs (e.g., how large the index would have to be, how frequently would the index have to be updated). In some embodiments, an index creation score may be determined by weighting various factors including frequency of query, performance improvement for query, storage that would be likely used by a possible index (e.g., adding various performance benefit factors and subtracting for various cost factors), performance or impact of write requests, and so on, so that if the index creation cost score is below a cost threshold, then the index may be created. In some embodiments, non-relational database service 210 may support interface commands or other requests that may provide limitations on the number of additionally created indexes or acceptable costs to be assumed, which may alter the criteria such as the index creation cost score threshold, according to the specified limitations/costs. In some embodiments, an efficiency evaluation may be made to determine when to create indexes, such as ratio of items returned out of items read that would cause an index to be created if the ratio is below a threshold amount. In some embodiments, index addition 322 may use predicted performance in addition to performance determined from metrics of queries, as well as other requests like writes, that are already performed. For example, a machine learning model may be trained to predict the likelihood of receiving a same query (or same query class/category of the query) for the database by training on performed queries to determine an input vector (or other criteria) of a given query that can be processed through the model to determine the likelihood of that query being received again. In this way, indexes may be added sooner than if index addition 322 were to wait until a known frequency of receiving queries was determined.

In order to make these evaluations, index addition 322 may have to determine the schema that would be used to project the subset of data (e.g., from table partitions) into the possible index. For example, operators in a query language, such as "=" would be identified in order to determine which attributes, fields, or other item values are predicates for performing a query. Such predicates would then be selected for projection in the schema. In some embodiments, the predicates may also indicate an ordering or other organization information in the schema. For instance, instead of the key value that is used to perform lookups for any item in table(s), the attribute (or multiple) attributes identified in the predicate, such as age or location can be used to order items in the additional index instead.

In various embodiments, index addition 322 may determine whether an existing index (e.g., already created automatically) already provides good performance for a query (e.g., according to schema information maintained for that existing index)— even if the existing index was not created specifically for that query. For example, if multiple attributes are projected into an additional index, then one of the multiple attributes may be usable to perform the query.

Index-based query optimizer 320 may provide a recommendation (or instruction) to create a new secondary index 326, in some embodiments, to index creation 330. Auto-index management 220 may implement index creation 330 to manage the operations to create a new index. In some embodiments, index creation 330 may be implemented as part of a control plane, like control plane 212 instead of being implemented as part of a separate sub-system/micro-service of non-relational database service 210, as depicted in FIGS. 2 and 3.

Additional indexes may be created using different techniques. In some embodiments, additional indexes may be created without interfering or making unavailable the source table(s) from which items are projected into the new index. For example, in some embodiments, instructions may be sent to source storage nodes for the table(s) used to create the new secondary index which may store the attributes of items specified according to the schema for the recommended secondary index 326 in the new respective partition(s) of the storage nodes that will store the new secondary index (which may be different than the storage nodes of the source table).

In other embodiments, techniques that reduce the burden on storage nodes of the source table may be implemented, as illustrated in FIG. 3. For example, index creation 330 may send instructions to create the secondary index, as indicated at 340. The instructions to storage node(s) 360 may allocate or otherwise prepare storage node(s) 360 to host the new secondary index as one or more index partition(s) 362, in some embodiments. For instance, metadata or other information to prepare storage node(s) 360 to begin accepting data for index partition(s) 362 may be generated and/or provided to storage node(s) 360. Index creation 330 may leverage backup snapshots created for source tables in order to create index partitions from the backup snapshot instead solely from the source table, in some embodiments. In this way, secondary index creation can avoid burdening or impacting the workload of source storage nodes which may still be handling current requests, like queries, as discussed above. For example, instructions to create secondary index 340 may be sent to data storage service 280, which may copy a partition (or create an index partition according to the schema for the new secondary index) or otherwise create index partitions 344 to storage node(s) 360 (bypassing source storage nodes 350 for table partition(s) 352). Because the tables that are a source for the new secondary index, table partition(s) 352, are still available for access requests (including updates), instructions indicating the creation of the secondary index 340 may also be sent, which may be used to update snapshot to be consistent with the current state of table partition(s), as indicated at 354. These updates may be provided for the life of the secondary index as the new secondary index may provide eventual consistency with respect to changes made to table partition(s) 352.

In various embodiments, index creation 330 may implement various management techniques to avoid creation work for secondary indexes that would slow down or otherwise perceptibly impact the performance of client workloads at non-relational database service 210. For instance, index creation 330 may delay the creation of a new secondary index if a number of created secondary index exceeds a limitation (e.g., no more than two secondary index creation jobs ongoing at a time). In some embodiments, index creation 330 may provide index state (e.g., creation status such as "joining" "in progress," "ready," "current," "deleting," "dropping," etc.) or otherwise identify the new index, as indicated at 304. Query handling that may make use of the new index, as discussed below with regard to FIG. 4, may receive or obtain the indication of the new index in order to use it for queries.

Figure 4:
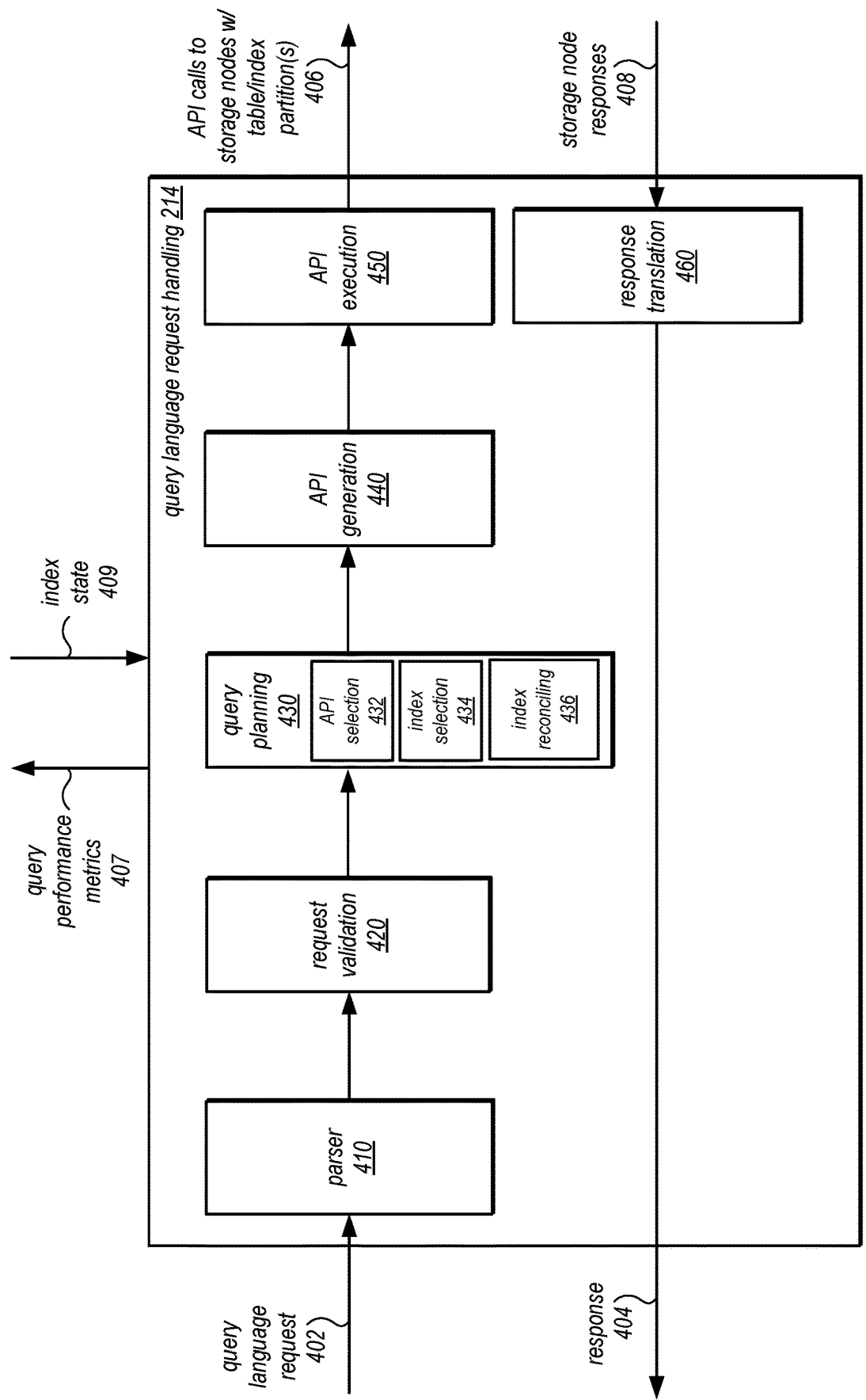
FIG. 4 is a logical block diagram illustrating query handling that uses automatically created indexes, according to some embodiments.

FIG. 4 is a logical block diagram illustrating query handling that uses automatically created indexes, according to some embodiments. Query request handling 214 may implement parser 410 to parse a received query language request 402. For example, parser 410 may identify or recognize keywords, parameters, or other delimiters for the query language. In some embodiments, parser 410 may be invoked or implemented as a library for the query language that may be received, such as SQL parsing library or other query language such as PartiQL (which may extend and/or be compatible with the SQL) which may provide the information to parse query language request 402. Parser 410 may generate a symbol tree and/or parse graph which may be provided to request validation.

Request validation 420 may examine the specified commands, parameters, and operators to determine whether the request 402 is valid. For example, specified commands may be compared with a white list of supported commands. In some embodiments, request validation 420 may examine parameters for validity. For example, the data types of specified parameters may be evaluated for supported data types in the non-relational database service. Request validation 420 may also validate the content of some parameters, such as whether or not a specified table or data set exists. Invalid requests may be rejected with a response that indicates the command is not supported (not illustrated).

Query planning 430 may receive the command(s) and valid parameter(s) for selecting an API, as indicated at 432, selecting whether to query a table or index (which may be automatically created), as indicated at 434, and whether any reconciliation according to query consistency type for an index should be performed, as indicated at 436. For example, API selection may maintain a mapping or other classification scheme for commands. Each command classification may include one or more possible APIs which may be invoked to provide a result consistent with the command. For instance classifications may be divided into data definition language (DDL) requests and data manipulation language (DML). These classifications may be further broken down into requests (e.g., DDL into create table or drop table and DML into select, update, insert, and delete). Each command may be further broken down into groups of possible requests. For example, select may be mapped to possible get, query, and scan APIs. In some embodiments, the performance costs of each API in a classification may be ranked or compared so that API selection 430 may make an optimal selection of the most performant API. Such a selection may be conditioned on whether the appropriate parameters for the different types of requests are specified in the query language request.

In some embodiments, different copies of a database, such as a secondary indexes may be selected, as indicated at 434, and thus API(s) may be selected to be directed to those alternative copies, which may provide more performant access to the requested data in some scenarios. For example, index state 409 which indicates those secondary indexes that are created automatically according to the evaluation of query performance, as discussed above with regard to FIG. 3, may be provided to query language request handling 214. In this way, query planning 430 may maintain availability information for tables and secondary indexes to make selections. As secondary indexes may be generated to improve performance of queries, in some embodiments, if a secondary index exists that can be utilized, the secondary index may be utilized instead of a table.

In some embodiments, different consistency levels may be provided for handling queries to database data. For example, an eventually consistency level may be specified by a query which may allow that as long as a queried data source (e.g., table or secondary index) will be eventually consistent with updates performed to the table), then a returned result may be valid for that client application. If, however, a higher consistency level, such as strong consistency (discussed above with regard to FIG. 1) is specified or determined for the query, then index reconciling 436 may determine whether multiple data sources need to be accessed (and how). For example, index reconciling 436 may determine a query consistency level and select additional API requests to perform the query in order to determine whether information from a source table at a source table storage node would supersede the information in a secondary index. For example, an API request to check or obtain a timestamp, version number, or other state information from a source table to compare with the corresponding timestamp, version number, or other state information of the secondary index (or values to be obtained from the secondary index) may be included to determine whether to obtain data that is strongly consistent (from the source table storage nodes) should be used instead of the data from the index storage nodes. In some embodiments, strongly consistent queries may be directed, by default, to source table storage nodes instead of index storage nodes.

API generation 440 may generate the selected API(s) to perform query language request 402. For example, API generation 440 may construct or specify a message, instruction, or other request to make the appropriate API calls. In some embodiments, API generation 440 may convert or change data types of parameters from query language specified data types to a corresponding data type supported by non-relational database service 210. For example, a "blob" data type in the query language request may be changed to a "binary" data type. In some instances, changing the data type may include reformatting (as opposed to just changing the data type designation) the data (e.g., removing trailing zeros, representing NULL differently, etc.). In some embodiments, an intermediate format or other representation of data in an originally specified data type may be used to determine which data type to use in the translated API. For example, a "Date" data type may be stored in a binary format, literal (e.g., character literals) format, or other representation in order to apply one or more translation rules to detect the characteristics of a "Date" and select a "String" translation data type. Some changes of data type may result in data loss and thus could trigger a failure or validation error similar to request validation 420, resulting in the request not being performed, in some embodiments. API execution 450 may then send the generated API calls to the appropriate storage nodes 406 with the identified table/index partition(s).

Query language request handling 214 may also implement response translation 460. Response translation may receive various storage node response(s) 408 for the API(s) of query language request 402. In those scenarios where the response is expected in a particular format, response translation 460 may perform the data format change (e.g., from a JSON format to an ION format). In some embodiments, data type conversions may be reversed to return data types specified differently for the API calls to be reverted back in a result or response to the expected data type.

As indicated at 407, performance metrics for query performance may be reported for tracking, as discussed above with regard to FIG. 3. For example, various resource utilization, timing, number of operations, description of queries, among other information may be reported. In some embodiments, query language request handling 214 may forward performance metrics received from storage nodes for respective queries (e.g., received as part of response(s) 408. Other performance metrics for other access requests may also be provided (in addition to query performance metrics), but are not illustrated. For example, the frequency of requests that cause writes to tables may be determined and provided. In some embodiments, components of request routing nodes 250 or other nodes that may handle these other requests in addition to query language requests (e.g., query language query engine nodes 240) may track and provide such performance metrics to auto-index management 220.

Figure 5:
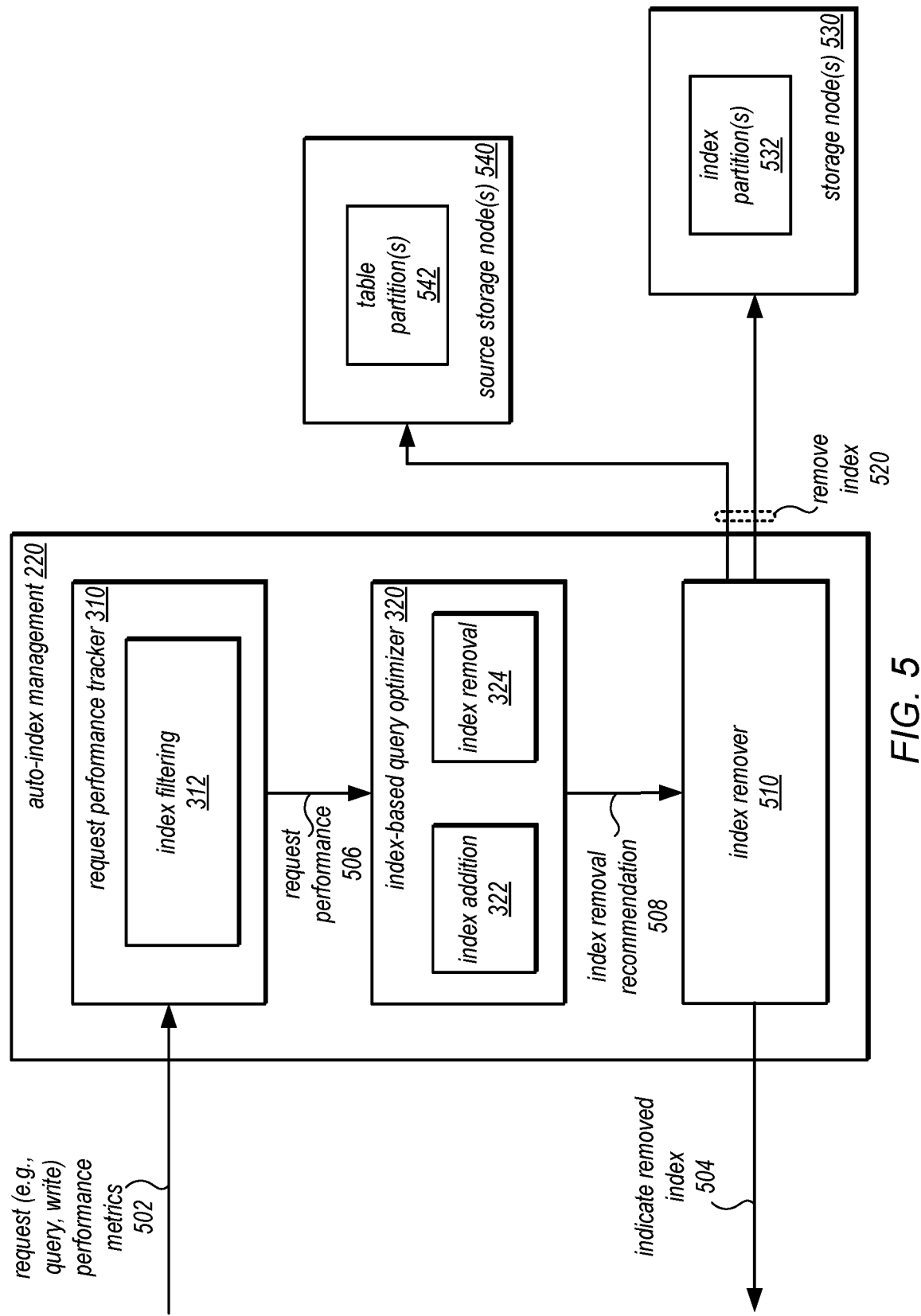
FIG. 5 is a logical block diagram illustrating auto-index management for evaluating query performance to remove an automatically created secondary index, according to some embodiments.

FIG. 5 is a logical block diagram illustrating auto-index management for evaluating query performance to remove an automatically created secondary index, according to some embodiments. Similar to FIG. 3 discussed above, auto-index management 220 may implement request performance tracker 310, in some embodiments. to collect or obtain request performance metrics 502. As discussed above, request performance metrics 502 may be provided by query language engine node(s) 240, request routing nodes 250 and/or storage nodes 230, in some embodiments. Request performance metrics 502 may include various features of query performance, such as resource utilization (e.g., for memory, storage, network, processor, etc.), performance time, number and/or type of operations for queries (e.g., scans, lookups, etc.), and/or any other information descriptive of the performance of queries at non-relational database service 210. As discussed above, request performance tracker 310 may generate or create derived metrics or other performance measures from obtained request performance metrics 302, which may be provided as query performance 506 for consideration by index removal 324 in index-based query optimizer 320.

For example, index removal 324 may implement a cost-benefit analysis in order to determine whether to remove an existing secondary index. Size of a secondary index, for example, may be indicative of the cost of the secondary index, whereas frequency of access for querying and/or the time reduction obtained by using the secondary index for a query may be indicative of the benefit. As discussed above with regard to FIG. 3, in some embodiments, a score may be created that weights various performance measures or factors (e.g., size, frequency of access, performance improvement, etc.) in order to identify a secondary index for removal by comparing the score with a threshold, which may indicate whether or not to retain or remove the index. These scores may be updated as new query performance 506 is provided (e.g., a score may lower if no query has accessed the secondary index since a last update).

Index-based query optimizer 320 may provide a recommendation (or instruction) to remove a secondary index 508, in some embodiments, to index remover 510. Auto-index management 220 may implement index remover 510 to manage the operations to remove a secondary index. In some embodiments, index remover 510 may be implemented as part of a control plane, like control plane 212 instead of being implemented as part of a separate sub-system/micro-service of non-relational database service 210, as depicted in FIGS. 2 and 5. Index remover 510 may send instructions 520 to remove the index to storage node(s) 530, which may no longer make index partition(s) 532 available, reclaim, delete, or mark for deletion index partition(s) 532. Instructions 520 may also indicate to storage node(s) 540 to no longer replicate updates made to table partition(s) 542 that are the source of index partition(s) 532.

Figure 6:
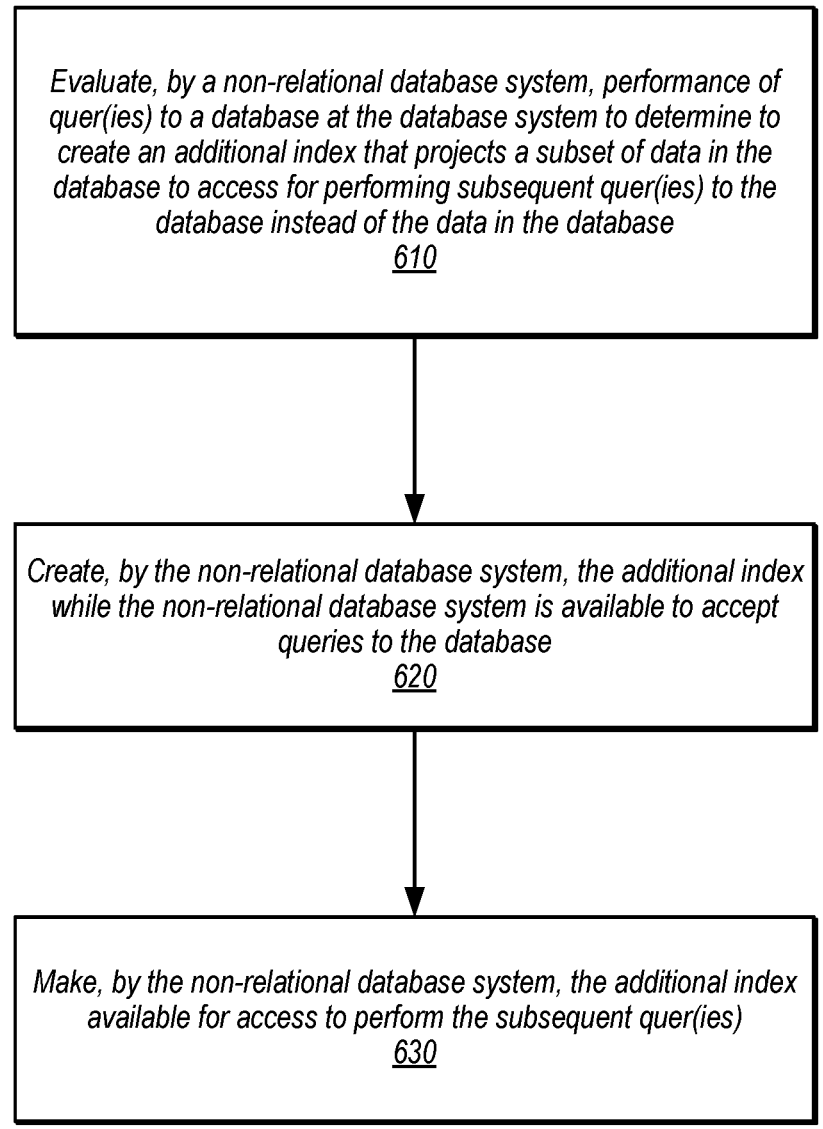
FIG. 6 is a high-level flowchart illustrating various methods and techniques to implement automatic index management for a non-relational database, according to some embodiments.

The examples of a database service that implements as discussed in FIGS. 2-5 above have been given in regard to a non-relational database service (e.g., a NoSQL database service, document database, a key-value store, etc.). However, various other types of non-relational database systems may implement automatic index management for a non-relational database, in other embodiments. FIG. 6 is a high-level flowchart illustrating various methods and techniques to implement automatic index management for a non-relational database, according to some embodiments. These techniques, as well as the techniques discussed with regard to FIGS. 7-8, may be implemented using components or systems as described above with regard to FIGS. 2-5, as well as other types of databases, query engines, or systems, and thus the following discussion is not intended to be limiting as to the other types of systems that may implement the described techniques.

As indicated at 610, performance of quer(ies) to a database at a database system may be evaluated by the database system to determine to create an additional index that projects a subset of data in the database to access for performing subsequent quer(ies) to the database instead of data in the database, in some embodiments. Query performance may include various features, metrics, and/or other information for queries, such as resource utilization (e.g., for memory, storage, network, processor, etc.), performance time, number and/or type of operations for queries (e.g., scans, lookups, etc.), and/or any other information descriptive of the performance of queries at the non-relational database system. Query performance may include derived metrics or other performance measures from obtained other query performance metrics, such as determining the performance of various metrics over different measurement time periods (e.g., frequency of queries, amount of memory utilization, etc.), the rate of change within or between measurement time periods (e.g., to distinguish between short term performance bursts and long-term workload changes), a percentage of items returned out of the total number of items read for the query. In addition to query performance metrics, performance metrics for other requests may also be evaluated. For example, performance metrics for inserts, updates, deletions, or other requests that cause writes to the data may be generated and also evaluated as part of determining whether to create a secondary index.

Evaluation of these metrics may be performed in various ways. For example, in some embodiments, a machine learning model may take various performance measures as a feature vector to perform identify whether a corresponding query (or class/category of query) should have a created index. For example, pattern identification, frequency prediction, and/or various other machine learning based analyses may be implemented. As discussed above with regard to FIG. 3, in some embodiments an index creation cost score may be determined that factors in various features, such as query performance, write performance, as well as other information, like the statistical distribution of values in table (e.g., sparseness of attributes) which can be determined from the tables directly (or from back snapshots). In some embodiments, the index creation cost score may be generated that weights various performance measures including frequency of query, performance improvement for query, storage that would be likely used by a possible index (e.g., adding various performance benefit factors and subtracting for various cost factors) so that if the index creation score is below a threshold (which may be indicative of a point where cost exceeds benefit), then the index may be created. In some embodiments, filtering techniques to ignore or not consider a query (or class/category of query) for consideration may be applied until a minimum frequency of performing the query (or class/category of query) is achieved. In this way, indexes may not be created for infrequently performed queries.

The evaluation of the query performance may determine the schema of the query to project the subset of data in the database, in some embodiments. For example, operators in a query language, such as "=" would be identified in order to determine which attributes, fields, or other item values are predicates for performing a query. Such predicates would then be selected for projection in the schema. In some embodiments, the predicates may also indicate an ordering or other organization information in the schema. For instance, instead of the key value that is used to perform lookups for any item in table(s), the attribute (or multiple) attributes identified in the predicate, such as age or location can be used to order items in the additional index instead.

As indicated at 620, the additional index may be created by the non-relational database system while the non-relational database system is available to accept queries to the database, in some embodiments. For instance, as discussed above, various different online index creation techniques may be utilized, such as by relying on backup versions of database data (e.g., partition snapshots) and applying subsequent updates received after the backup versions were created (e.g., by applying log records that describe the updates) to create the additional index. The additional index may be created according to the scheme determined by the evaluation of the performance metrics, by storing only this values, fields, attributes, or other information specified in the schema according to the ordering or other organization information specified in the schema (e.g., ordering items in the additional index according to a common attribute or field, such as "date").

As indicated at 630, the additional index may be made available for access to perform the subsequent quer(ies), in some embodiments. For example, index state or other information may be provided to a query engine or other component that handles queries at the non-relational database system in order for the query engine to use the index to perform queries. In some embodiments, the additional index may be made available before it is "current" with source data. Instead, techniques to join data retrieved from the additional index with "current" data stored in the source data may be included when performing queries.

Evaluation of query performance may occur at different times. For example, periodically (e.g., every 30 minutes) the evaluation may be performed to see if a change in workload indicated by query performance information indicates a need to create an additional index. In some embodiments, a client request to optimize database performance could trigger the evaluation. In some embodiments, the evaluation may be triggered after a query that exceeds one or more performance thresholds (e.g., with respect to that query, such as a query with a running time that exceeds a time threshold). In some embodiments, a monitoring technique were performance information is updated as received (e.g., index creation scores are updated as new information is received) so that when criteria for creating an additional index is satisfied, the additional index is created.

Figure 7:
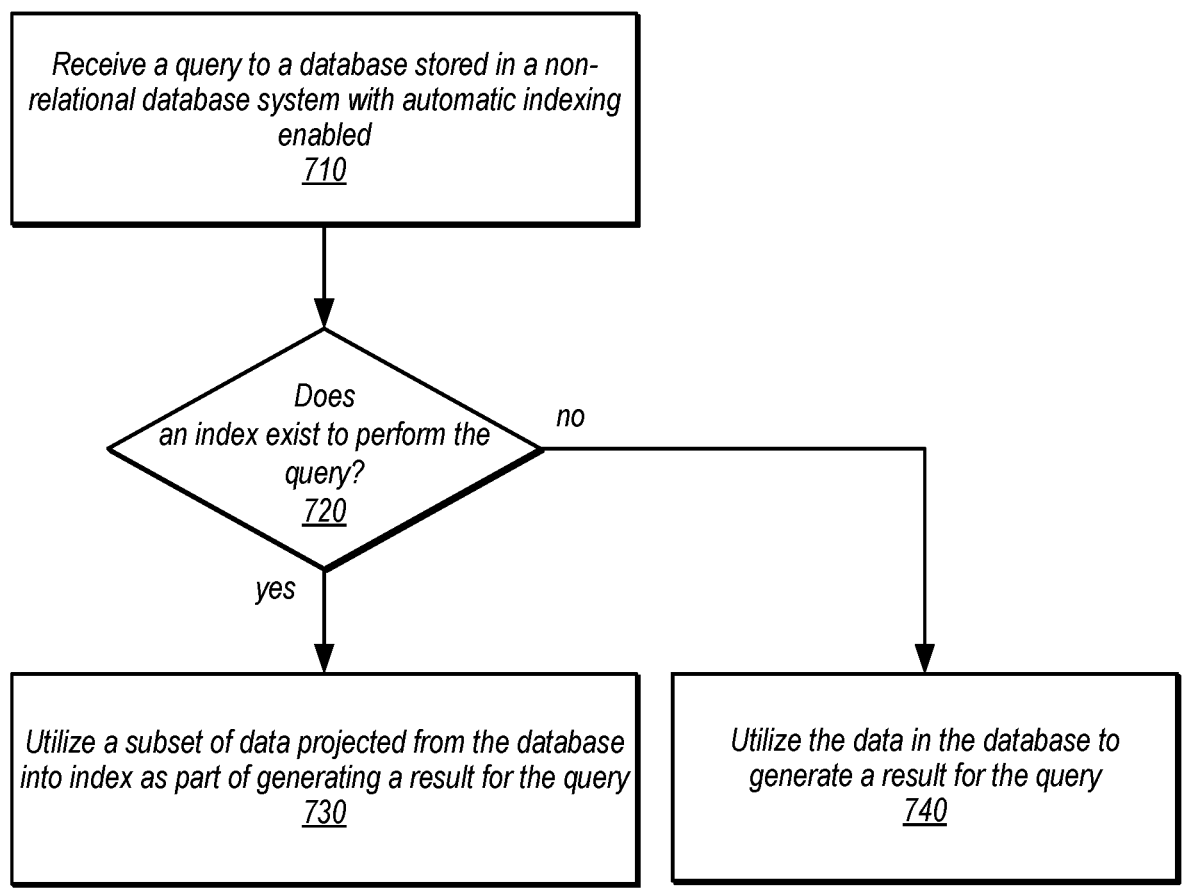
FIG. 7 is a high-level flowchart illustrating various methods and techniques to implement query handling for automatically managed indexes for a non-relational database, according to some embodiments.

FIG. 7 is a high-level flowchart illustrating various methods and techniques to implement query handling for automatically managed indexes for a non-relational database, according to some embodiments. As indicated at 710, a query to a database stored in a non-relational database system with automatic index enabled may be received, in some embodiments. Automatic index management techniques discussed above and below may be enabled or disabled via request (e.g., an API, such as an API to non-relational database service 210 in FIG. 2 to configure the database).

The query may be formatted or specified in various ways. For example, the query may be received via a network interface for the non-relational database system (e.g., non-relational database service 210 in FIG. 2). In some embodiments, the query may be formatted according to a protocol specified by a driver or connection component implemented at a client application that can format and send the request to the non-relational database system. In some embodiments, the request may be formatted according to an API for submitting requests in a query language (e.g., "ExecuteQueryLanguageStatement"). In some embodiments, the non-relational database system may support performing different access operations to the database (e.g., get data, put data, update data, delete data, scan for data, query for data, etc.) which may be invoked by different respective APIs.

Although the database system may be non-relational, in some embodiments, the query may be formatted in a query language for accessing data according to a relational data schema, in some embodiments. For example, SQL or other query languages that presume a structure, such as a pre-defined data schema for the data stored in the database (e.g., a number of columns with specified data types). In some embodiments, the query language may also support operations over data that is not structured, and thus stored without being stored in a pre-defined data format. For example, a query language may be SQL-compatible but also accept as parameters or inputs for operations over semi-structured data, nested data, and schema-less data, in addition to data stored a relational data format.

As indicated at 720, a determination may be made as to whether an index exists to perform the query, in some embodiments. As the index may have been automatically created, the query may not identify the index as a target of the query, in some embodiments. In some embodiments, the predicates that describe the attributes, features or other information to satisfy the query may be used to identify whether an index exists for performing the query. In some embodiments, a comparison may be made to determine whether the query matches a previous query that caused the generation of the index. As discussed above, state information indicating available indexes may be maintained and checked with respect to the query, in some embodiments.

If no index exists to perform the query, then the data in the database may be utilized to generate a result for the query, in some embodiments, as indicated at 740. For example, various operations to access the data may be performed (e.g., API calls to get, read, or scan data in storage nodes as discussed above with regard to FIG. 4) may be performed.

If an index does exist to perform the query, then a subset of data projected from the database into the index may be used as part of generating a result for the query, as indicated at 730, in some embodiments. For example, various operations to access the subset of data in the index (as opposed to source data) may be performed (e.g., API calls to get, read, or scan data in storage nodes storing index partitions as discussed above with regard to FIG. 4) may be performed. In some embodiments, a consistency level of a query may determine whether or not additional operations to access source data may be performed. For instance, if an eventual consistency level is specified for the query, then no operations to the source data may be performed. In some embodiments, if a strong consistency level is specified for the query then source data may be also accessed in order to ensure that results of the query satisfy the specified consistency level.

Figure 8:
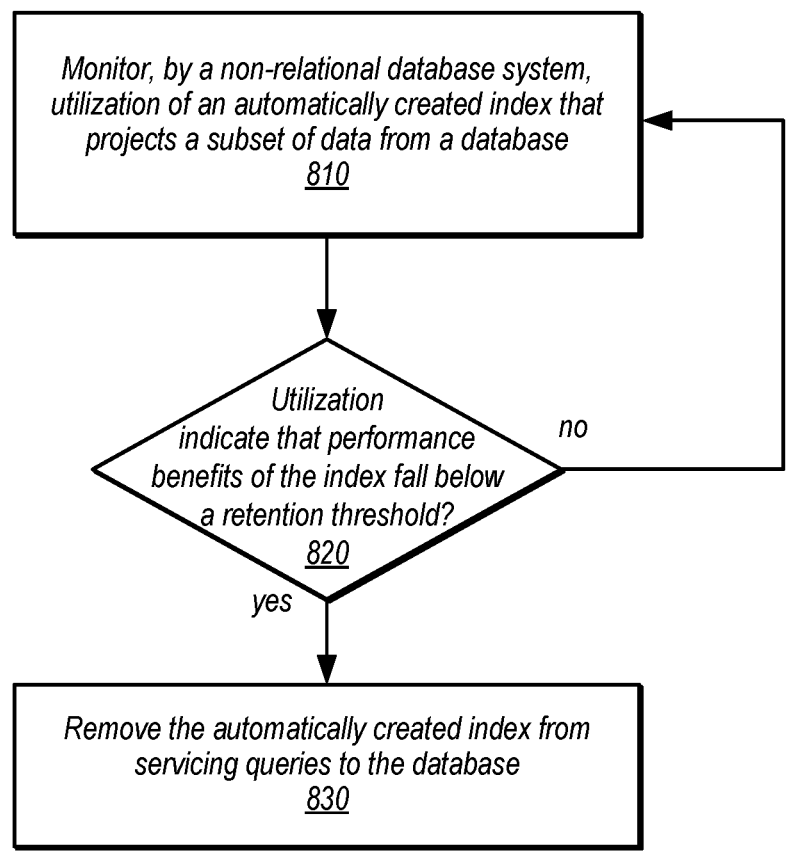
FIG. 8 is a high-level flowchart illustrating various methods and techniques to implement automatically removing an index for a non-relational database, according to some embodiments.

FIG. 8 is a high-level flowchart illustrating various methods and techniques to implement automatically removing an index for a non-relational database, according to some embodiments. As indicated at 810, utilization of an automatically created index that projects a subset of data from a database may be monitored by a non-relational database system, in some embodiments. Utilization may be indicated various query performance measurements or other information, as discussed above, including, but not limited to resource utilization (e.g., for memory, storage, network, processor, etc.), performance time, number and/or type of operations for queries that use the index, and/or any other information descriptive of the performance of queries using the index, such as the performance of various metrics over different measurement time periods (e.g., frequency of queries, amount of memory utilization, etc.), in some embodiments.

As indicated at 820, an evaluation of the utilization may indicate that performance benefits of the index fall below a retention threshold, in some embodiments. For example, a threshold may be determined specifically for the particular index (e.g., based on the storage or other costs to maintain the index) or may be a default value used for evaluating multiple automatically created indexes. In some embodiments, the utilization may be evaluated by determining a retention score which is indicative of the performance benefits of the index. The retention score may be updated as new information is obtained, in some embodiments. The retention score, like the index creation score discussed above, may weight one or more utilization measures.

As indicated at 830, if the utilization indicates that performance benefits of the index fall below the threshold, then the automatically created index may be removed from servicing queries to the database. For instance, the automatically created index may be marked for deletion, removed from index state or other information used to perform queries to the database, and/or otherwise made unavailable. Updates to items performed at source data may be stopped, in some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
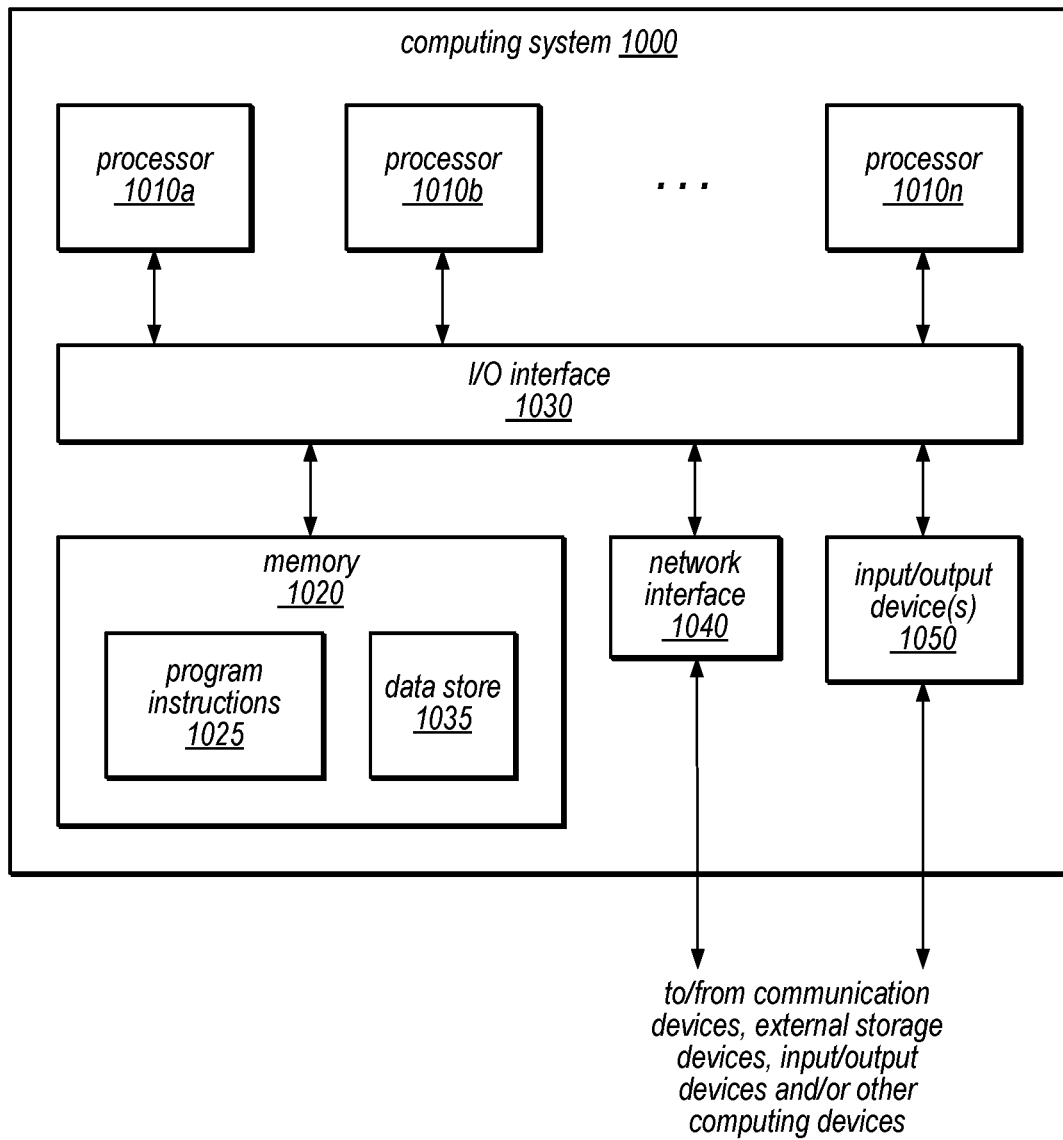
FIG. 9 is a block diagram illustrating an example computing system, according to some embodiments.

Embodiments to implement automatic index management for a non-relational database as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 to implement various features of a non-relational database system that may implement automatic index management for a non-relational database and/or other data accessible by processor 1010, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor, cause the at least one processor to implement a non-relational database system, configured to:
        perform one or more queries to one or more tables stored in the non-relational database system;
        obtain one or more performance metrics for the one or more queries;
        evaluate the one or more performance metrics to determine to create a secondary index that projects a subset of the one or more tables in the database to access for performing one or more subsequent queries to the database;
        responsive to the determination to create the secondary index:
            create the secondary index while the database system is available to accept queries to the database; and
            include the secondary index in planning for performing the one or more subsequent queries to the database, wherein the planning comprises:
                determining respective types of consistency specified in the one or more subsequent queries; and
                selecting the secondary index to perform the one or more subsequent queries instead of the one or more tables in the database according to the determined respective types of consistency for the one or more subsequent queries.

2. The system of claim 1, wherein the non-relational database system is further configured to:
    receive a new query to one of the one or more tables in the database;
    determine that the secondary index is usable to perform the new query; and
    access the subset of the one or more tables in the secondary index to perform the new query.

3. The system of claim 1, wherein the non-relational database system is further configured to:
    determine that utilization of the secondary index falls below a retention threshold; and
    remove the secondary index from servicing queries at the non-relational database system.

4. The system of claim 1, wherein the non-relational database system is a non-relational database service and wherein the query is specified according to a query language supported by the non-relational database service in addition to one or more Application Programming Interfaces (APIs) supported by the non-relational database.

5. A method, comprising:
    evaluating, by a non-relational database system, performance of one or more queries to a database at the database system to determine to create an additional index that projects a subset of data in the database to access for performing one or more subsequent queries to the database;
    creating, by the non-relational database system, the additional index while the database system is available to accept queries to the database; and
    including, by the non-relational database system, the additional index in planning for performing the one or more subsequent queries to the database, wherein the planning comprises:
        determining respective types of consistency specified in the one or more subsequent queries; and
        selecting the secondary index to perform the one or more subsequent queries instead of the one or more tables in the database according to the determined respective types of consistency for the one or more subsequent queries.

6. The method of claim 5, further comprising:
receiving a new query to the database;
determining that the additional index is usable to perform the new query; and
utilizing the subset of the data in the additional index to perform the new query.

7. The method of claim 6, wherein the new query is specified as an eventually consistent query.

8. The method of claim 5, further comprising:
determining that utilization of the additional index falls below a retention threshold; and
removing the additional index from servicing queries at the non-relational database system.

9. The method of claim 5, wherein evaluating the performance of one or more queries to the database at the database system to determine to create the additional index comprises:
generating a score that weights the performance of the one or more queries and weights the performance of one or more other access requests; and
determining that the score is below a cost threshold to make the determination to create the additional index.

10. The method of claim 5, further comprising:
after determining to create the additional index, delaying for a period of time the creating of the additional index.

11. The method of claim 5, further comprising determining a schema for the additional index based, at least in part, on respective predicates of the one or more queries, wherein the schema is used to determine the projection of the subset of the data to store in the additional index.

12. The method of claim 5, wherein the evaluating the performance of one or more queries to a database at the database system is performed after receiving a request to enable automatic index management at the non-relational database system.

13. The method of claim 5, further comprising stopping tracking performance of a query to the non-relational database system that is received at a frequency below a frequency threshold.

14. One or more non-transitory, computer-readable storage media, storing program instructions that when executed on or across one or more computing devices cause the one or more computing devices to implement a non-relational database system that implements:
performing one or more queries to a database at the non-relational database system;
evaluating performance of the one or more queries to determine to create an additional index that projects a subset of data in the database to access for performing one or more subsequent queries to the database;
responsive to the determination to create the additional index:
creating the additional index while the database system is available to accept queries to the database; and
including the additional index in planning for performing the one or more subsequent queries to the database, wherein the planning comprises:
determining respective types of consistency specified in the one or more subsequent queries; and
selecting the secondary index to perform the one or more subsequent queries instead of the one or more tables in the database according to the determined respective types of consistency for the one or more subsequent queries.

15. The one or more non-transitory, computer-readable storage media of claim 14, storing further instructions that when executed on or across the one or more computing devices cause the non-relational database system to further implement:
receiving a new query to the database;
determining that the additional index is usable to perform the new query; and
utilizing the subset of the data in the additional index to perform the new query.

16. The one or more non-transitory, computer-readable storage media of claim 15, wherein a strong consistency level is specified for the new query and wherein the one or more non-transitory, computer-readable storage media store further instructions that when executed on or across the one or more computing devices cause the non-relational database system to further implement utilizing the data in the database in addition to the subset of the data to satisfy the strong consistency level.

17. The one or more non-transitory, computer-readable storage media of claim 14, storing further instructions that when executed on or across the one or more computing devices cause the non-relational database system to further implement:
determining that utilization of the additional index falls below a retention threshold; and
removing the additional index from servicing queries at the non-relational database system.

18. The one or more non-transitory, computer-readable storage media of claim 14, storing further instructions that when executed on or across the one or more computing devices cause the non-relational database system to further implement stopping tracking performance of a query to the non-relational database system that is received at a frequency below a frequency threshold.

19. The one or more non-transitory, computer-readable storage media of claim 14, storing further instructions that when executed on or across the one or more computing devices cause the non-relational database system to further implement determining a schema for the additional index based, at least in part, on respective predicates of the one or more queries, wherein the schema is used to determine the projection of the subset of the data to store in the additional index.

20. The one or more non-transitory, computer-readable storage media of claim 14, wherein the non-relational database system is a non-relational database service and wherein the query is specified according to a query language supported by the non-relational database service in addition to one or more Application Programming Interfaces (APIs) supported by the non-relational database.

* * * * *